United States Patent
Tatsumi et al.

[11] Patent Number: 5,920,163
[45] Date of Patent: Jul. 6, 1999

[54] PHASE DETECTING CIRCUIT OF BRUSHLESS MOTOR AND MAGNETIC RECORDING AND REPRODUCING APPARATUS USING THE SAME

[75] Inventors: Hiroshi Tatsumi, Shiki-gun; Chiaki Yamawaki, Habikino, both of Japan

[73] Assignee: Sharp Kabushiki Kaisha, Osaka, Japan

[21] Appl. No.: 08/863,341

[22] Filed: May 27, 1997

[30] Foreign Application Priority Data

May 31, 1996 [JP] Japan ................................. 8-137815

[51] Int. Cl.$^6$ ................................................. A02K 23/00
[52] U.S. Cl. ........................ 318/254; 318/606; 318/607; 318/678
[58] Field of Search ...................... 318/254, 439, 318/138, 560, 561, 569, 600–605, 606–610, 677–678; 388/916

[56] References Cited

U.S. PATENT DOCUMENTS

| | | | |
|---|---|---|---|
| 4,010,463 | 3/1977 | Kay | 318/661 |
| 5,473,725 | 12/1995 | Chen et al. | 318/254 |
| 5,569,988 | 10/1996 | Kokami et al. | 318/254 |
| 5,789,891 | 8/1998 | Nakane | 318/626 |

FOREIGN PATENT DOCUMENTS 7-21843  3/1995  Japan.

*Primary Examiner*—David Martin
*Attorney, Agent, or Firm*—Nixon, & Vanderhye P.C.

[57] ABSTRACT

A differential amplifier amplifies a PG reproduction signal to a level permitting signal processing. A low-pass filter makes the signal waveform of a PG detection signal generated by the differential amplifier substantially uniform irrespectively of the rotational speed of a rotating drum. A comparator outputs a PG pulse by comparing an output of the low-pass filter with a threshold. A magnetic recording and reproducing apparatus having such a structure can detect the PG pulse with accuracy over a rotational speed range requiring a precision control of the rotating drum.

17 Claims, 7 Drawing Sheets

PHASE DETECTING CIRCUIT OF BRUSHLESS MOTOR AND MAGNETIC RECORDING AND REPRODUCING APPARATUS USING THE SAME

FIELD OF THE INVENTION

The present invention relates to a phase detecting circuit of a brushless motor, and a magnetic recording and reproducing apparatus like a digital video cassette recorder (hereinafter referred to as the digital VCR), and more particularly relates to a magnetic recording and reproducing apparatus performing a high-speed search.

BACKGROUND OF THE INVENTION

In recent years, there is a demand for an instant access by a high-speed search as well as a long time recording by a high recording density in the field of digital magnetic recording and reproducing apparatuses using a magnetic tape medium (for example, a digital VCR). When performing a high-speed search, it is necessary to control the rotational speed of a rotating drum according to the feed speed of the magnetic tape so that the track direction component of the relative speed of the magnetic tape to a rotating magnetic head becomes substantially the same as that in normal reproduction (i.e., the relative speed becomes uniform).

For example, when performing a high-speed search in an FF direction (a direction in which the magnetic tape is fast forwarded), the relative speed is made uniform by rotating the rotating drum at a higher speed than the drum rotational speed in normal reproduction. On the other hand, when performing a high-speed search in a REW direction (a direction in which the magnetic tape is rewound), the relative speed is made uniform by rotating the rotating drum at a lower speed than the drum rotational speed in normal reproduction. The rotational speed of the rotating drum will be explained in detail below by presenting a specific example using a HD specification and recommendation values determined by the HD Digital VCR Council. When performing a high-speed search at a speed 200 times higher than that in normal reproduction which is executed at a drum rotational speed of 9,000 [min$^{-1}$] and a magnetic tape feed speed of 37.6 [mm/sec.], the relative speed is made uniform by controlling the drum rotational speed so that the rotational speed becomes about 15,500 [min$^{-1}$] in the FF direction search and about 2,400 [min$^{-1}$] in the REW direction search.

In general, the drum is provided with a rotational speed detector (hereinafter referred to as the "FG"), and a rotational position detector (hereinafter referred to as the "PG"). The FG generates a plurality of pulses per rotation of a rotor (rotating section) so as to detect the number of rotations of the drum. The PG generates one pulse per rotation of the rotor so as to detect the absolute positional relationship between the rotating drum and the magnetic head.

The control of the rotational speed of the rotating drum is usually accomplished by a phase loop using a PG pulse produced by converting the PG detection pulse into a binary form, and a velocity loop using FG pulses produced by converting the FG detection signals into a binary form. Therefore, when rotating the drum while accurately controlling its rotational speed over a broad speed range from a low speed of 2,400 [min$^{-1}$] to a high speed of 15,500 [min$^{-1}$] like the above-mentioned example of a high-speed search, it is indispensable to accurately count the FG pulses and PG pulse at speeds ranging from 2,400 [min$^{-1}$] to 15,500 [min$^{-1}$].

Since the FG detection signals are signals produced in regular cycles, they are easily detected over a broad speed range by making a comparison with a zero crossing point. On the other hand, since the PG detection signal is a signal which generates only one pulse per rotation of the rotor and its peak value varies in proportion to the rotational speed of the drum, it is difficult to detect the PG pulse over a broad speed range by a conventional PG pulse detecting method.

The following description will explain the conventional PG pulse detecting method.

Figure 6:
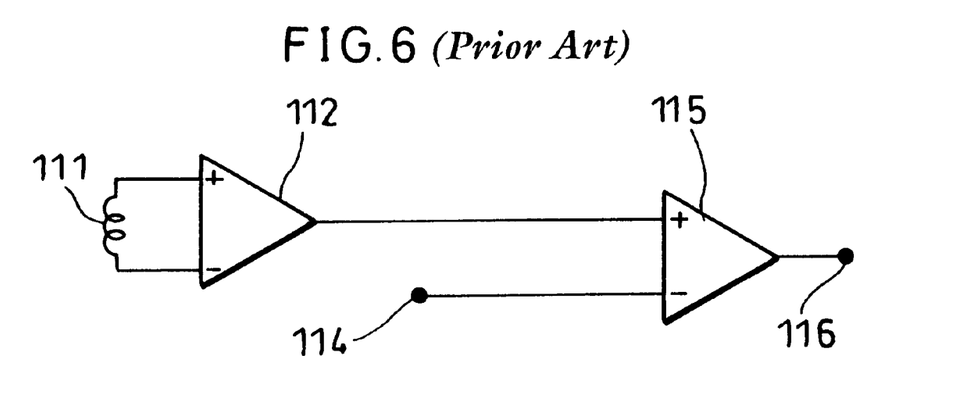
FIG. 6 is a circuit block diagram showing the structure of the principal section of a phase detection circuit of a brushless motor in a conventional magnetic recording and reproducing apparatus.

FIG. 6 is a block diagram showing the circuit structure of a conventional drum phase detector (PG). In the PG of this structure, a reproduced signal detected by a PG detecting coil 111 is amplified to a level permitting signal processing by a differential amplifier 112. The amplified output (PG detection signal) of the differential amplifier 112 is input to the non-inverted input of a comparator 115, and compared with a fixed threshold which is input to the inverted input of the comparator 115 from a terminal 114. A digital signal (PG pulse) which shows a logic state "1" when the PG detection signal is greater than the fixed threshold, and shows a logic state "0" when the PG detection signal is smaller than the fixed threshold, is output to a terminal 116 from the comparator 115.

A specific problem of the PG pulse detecting method using the PG shown in FIG. 6 will be explained below.

In the rotating drum, driving magnets are magnetized in a radial direction so that N poles and S poles which account for eight poles in total are alternately arranged. In addition, four PG forming poles as PG forming magnets are magnetized in a direction perpendicular to the magnetized direction of the respective driving magnets. The PG detecting coil 111 is a pattern having a shape of a substantially square bracket, and mounted on a position of a stator (fixed section) of the drum motor so that the PG detecting coil 111 faces the PG forming magnets when the PG forming magnets rotate and pass the PG detecting coil 111.

Figure 4A:
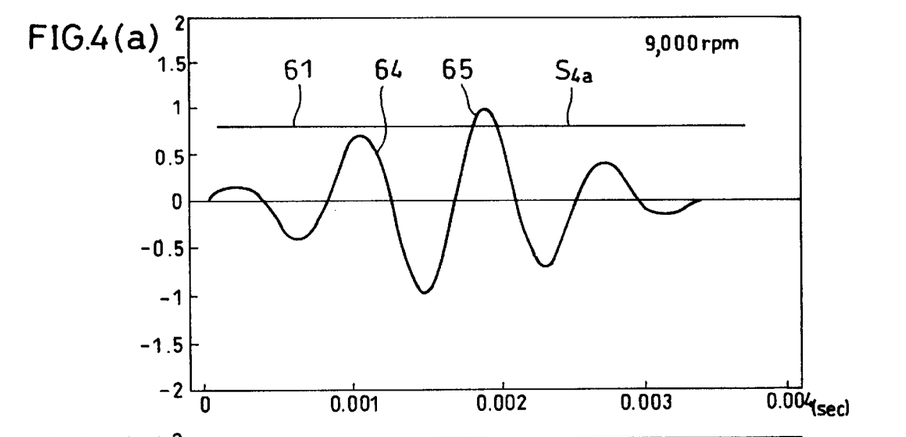
FIGS. 4(a) to 4(c) show the results of simulating the signal waveform of the PG detection signal.
Figure 4B:
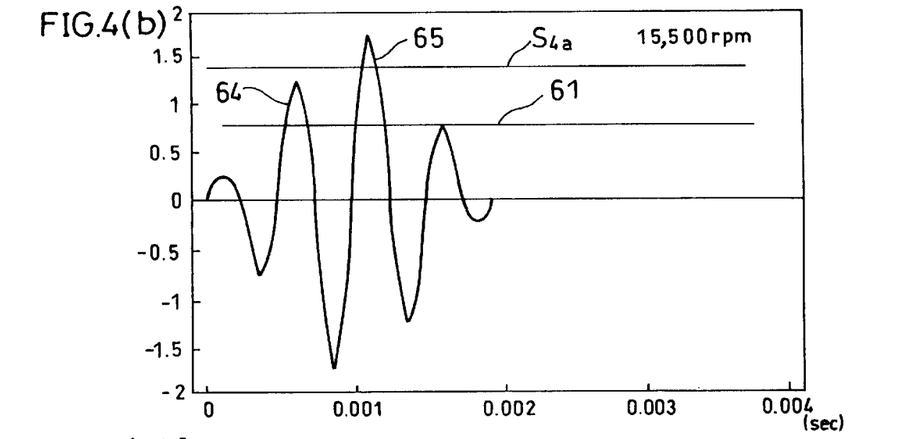
Figure 4C:
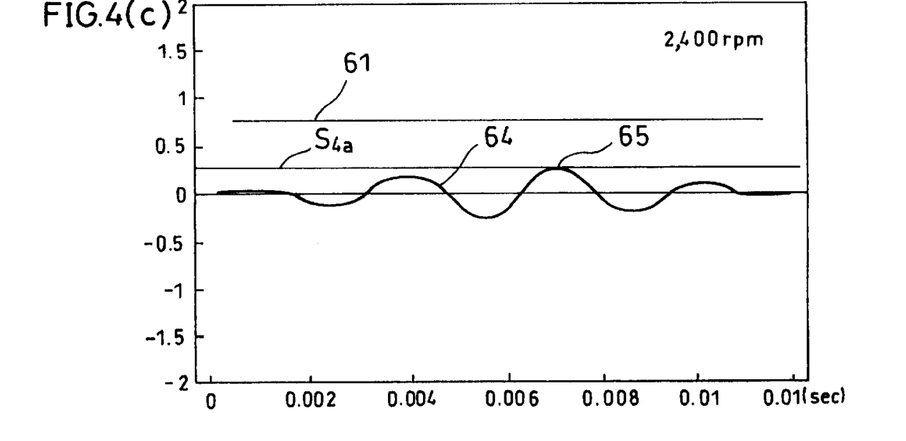

In the above-mentioned structure, in the vicinity of the time point at which the PG forming magnets and the PG detecting coil 111 face each other, the relative speed of the PG forming magnets to the PG detecting coil shows the greatest change. Therefore, as shown in FIGS. 4(a) to 4(c), at this time point, a main pulse 65 appears in the waveform of the PG detection signal. FIGS. 4(a) to 4(c) are the results of simulations, showing the waveform of the PG detection signal when the rotor was rotated in a counterclockwise direction in the rotating drum of the above-mentioned structure. The horizontal axis in each figure shows time, and the vertical axis shows values which are normalized by using 1 as a maximum value of the peak of the PG signal waveform when the number of rotations of the drum is 9,000 [min$^{-1}$]. FIG. 4(a) shows the PG detection signal waveform when the number of rotations of the drum is 9,000 [min$^{-1}$]. Similarly, FIG. 4(b) shows the PG detection signal waveform when the number of rotations of the drum is 15,500 [min$^{-1}$]. FIG. 4(c) shows the PG detection signal waveform when the number of rotations of the drum is 2,400 [min$^{-1}$].

It is clear from FIGS. 4(a) to 4(c) that the PG detection signal waveform repeats overshoot and undershoot, and has not only the main pulse 65, but also spurious pulses on both sides of the main pulse 65. The numeric value 61 shown in FIGS. 4(a) to 4(c) represents a fixed threshold level from the terminal 114 shown in FIG. 6.

In the PG detection signal obtained when the number of rotations of the drum is 9,000 [min$^{-1}$], as shown in FIG. 4(a), since only the main pulse 65 exceeds the threshold level 61, it is possible to obtain a correct PG pulse only in the portion of the main pulse 65 by the comparator 115. However, if the number of rotations of the drum is increased to 15,500 [min$^{-1}$], as shown in FIG. 4(*b*), since the peak value of the spurious pulses 64 on both sides of the main pulse 65 of the PG detection signal increases and exceeds the threshold level 61, PG pulses are generated at unnecessary positions. When the rotating drum is rotated at a low speed (for example, the number of rotations of the drum is 2400 [min$^{-1}$]), as shown in FIG. 4(*c*), the output of the PG detection signal is lowered, and even the main pulse 65 cannot exceed the threshold level 61. Thus, the PG pulse cannot be generated.

Namely, the drum phase detector of the conventional magnetic recording and reproduction apparatus has difficulty in accurately generating the PG pulse over a broad range of the drum rotational speed.

As a method for eliminating the spurious pulses generated when the drum is rotated at high speeds, a method (Japanese Publication for Examined Patent Application No. 21843/1995 (Tokukohei 7-21843)) used as a signal processing method in a magnetic recording device using a thin-film head may be adopted. This method eliminates the spurious pulses by circulation by using a structure formed by a plurality of delay circuits for introducing delays in the transmission of the detection signal, a plurality of amplitude regulating circuits for regulating the amplitudes of the outputs from the delay circuits, and an adder for providing the sum of the outputs from the amplitude regulating circuits. This structure is exactly the same as a so-called transversal filter. In the delay circuits, the delay time is determined so that the peak value of the main pulse and that of the spurious pulse overlap. It is possible to eliminate the spurious pulse in an arbitrary position by adjusting the delay time to an optimum value.

Figure 7:
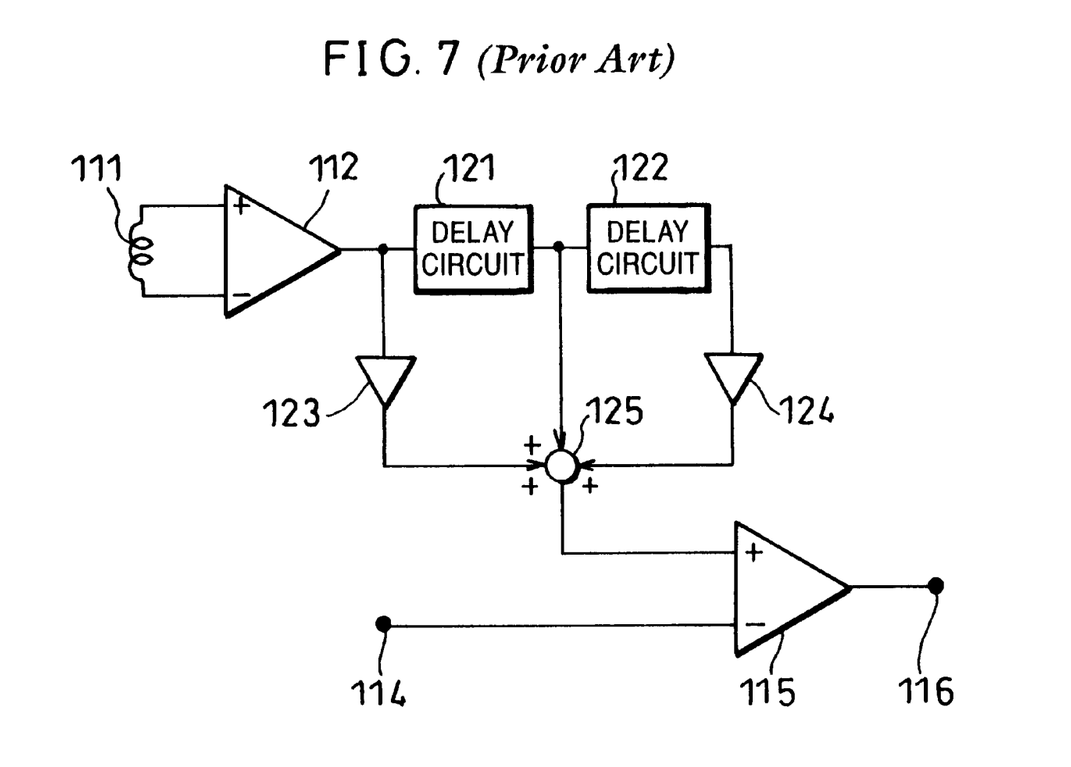
FIG. 7 is a circuit block diagram showing the structure of the principal section of a phase detection circuit of a brushless motor in a conventional magnetic recording and reproducing apparatus using delay circuits.

An example of the structure of the PG using the above-mentioned delay circuits is illustrated in FIG. 7. In this structure, the output of the PG detecting coil 111 is amplified by the differential amplifier 112, and then input to a delay circuit 121 and an amplitude regulating circuit 123. The output of the delay circuit 121 is input to a delay circuit 122. Further, the output of the delay circuit 122 is input to an amplitude regulating circuit 124. Then, the outputs of the amplitude regulating circuits 123 and 124 and the output of the delay circuit 121 are respectively input to a waveform synthesizing circuit 125. The waveform synthesizing circuit 125 outputs a signal produced by eliminating the spurious pulses based on the input signal. The output of the waveform synthesizing circuit 125 is input to the non-inverted input of the comparator 115, and the level of the output is compared with the fixed threshold input to the inverted input from the terminal 114. As a result, the PG pulse is output from the terminal 116. It is necessary to provide the same number of delay circuits as the number of spurious pulses to be eliminated.

However, in a magnetic recording and reproducing apparatus using the technique disclosed in the above-mentioned publication (Tokukohei 7-21843), since the delay time in the delay circuits is uniform, the spurious peak cannot be certainly eliminated in a high-speed search which is performed by broadly changing the number of rotations of the drum according to the feed speed and feed direction of the magnetic tape.

This problem can be solved by changing the structure so that the delay time in the delay circuits becomes variable. However, if there are a number of spurious peaks that exceed the threshold, a plurality of delay circuits for introducing variable delays are required. Thus, this structure causes a new problem, namely, an increase in the cost.

SUMMARY OF THE INVENTION

It is an object of the present invention to achieve a phase detecting circuit of a brushless motor, capable of generating a pulse signal for accurately detecting a phase over a broad rotational speed range, with a simplified circuit structure. It is another object of the present invention to provide a magnetic recording and reproducing apparatus capable of changing the feed speed of a magnetic tape within a broader range during a high-speed search with the use of the phase detecting circuit of the brushless motor.

In order to achieve the above objects, a phase detecting circuit of a brushless motor of the present invention is characterized in including:

a phase detecting magnet disposed in the rotating section of the brushless motor;

a rotational phase detector, disposed in the fixed section of the brushless motor, for detecting as an electrical signal a change in the relative position of the phase detecting magnet to the rotational phase detector;

an amplifier for generating a phase detection signal by amplifying the electrical signal;

an attenuator for attenuating the amplitude of the phase detection signal substantially in proportion to the frequency of the phase detection signal within a predetermined frequency range; and a comparator for generating the pulse signal based on a relationship between the level of an output of the attenuator and a threshold signal of a predetermined level.

In this structure, when the brushless motor is rotated, the relative position of the phase detecting magnet to the rotational phase detector changes due to the phase difference between the phase detecting magnet and the rotational phase detector. Therefore, an electrical signal having a level corresponding to a change in the relative position is output from the rotational phase detector, and amplified by the amplifier. When the rotational speed is substantially uniform, the smaller the phase difference between the phase detecting magnet and the rotational phase detector, the greater the change of the relative position. Therefore, the phase detection signal from the amplifier has the highest level when the phase detecting magnet faces the rotational phase detector. Here, the peak value and frequency of the phase detection signal increase as the rotational speed becomes higher. On the other hand, the attenuation of the attenuator increases substantially in proportion to the frequency of the phase detection signal. As a result, the increase in the peak value of the phase detection signal is cancelled by the attenuator, and the peak value of the output of the attenuator becomes substantially uniform irrespectively of the rotational speed of the brushless motor. Accordingly, the amplitude of overshoot or undershoot which occurs in front of or behind the peak of the output of the attenuator maintains a substantially uniform value.

Consequently, the phase detecting circuit can certainly discriminate the peak of the output of the attenuator from overshoot or undershoot irrespectively of the rotational speed of the brushless motor by a simple structure of comparing the threshold signal of a fixed level and the output of the attenuator, and output a correct pulse signal. As a result, even though the phase detecting circuit of the brushless motor has a simple circuit structure, it can detect a phase over a broader speed range than a conventional structure.

Considering the simplification of the circuit, it is desirable to form the attenuator having the above-mentioned structure by a first order low-pass filter. In this case, it is preferred that the cutoff frequency F [Hz] of the low-pass filter satisfies $$F = (Tm \times NL \times P)/(Tp \times 60 \times 2)$$

where NL [min$^{-1}$] is a lower limit of a predetermined rotational speed range of the brushless motor, Tp is a magnetized pitch between the N pole and the S pole of the phase detecting magnet, Tm is a magnetized pitch between the N pole and the S pole of a driving magnet of the brushless motor, and P is number of poles of the driving magnet.

If the cutoff frequency is set higher than the F [Hz] above, there is a possibility that the attenuation factor of the attenuator is not proportional to the frequency in the vicinity of the lower limit of the rotational speed range. On the other hand, if the cutoff frequency is set lower than the F [Hz] above, the output of the attenuator in the rotational speed range is lowered.

However, by setting the cutoff frequency to the F [Hz] above, it is possible to improve the output of the attenuator in the rotational speed range while satisfying the requirements for frequency characteristics of the attenuation factor of the attenuator.

In order to achieve the above object a phase detecting circuit of a brushless motor according to another embodiment of the present invention is based on the above-mentioned structure, and characterized in including a threshold changer for varying the level of the threshold signal substantially in proportion to the rotational speed of the brushless motor, instead of the attenuator disposed between the rotational phase detector and the comparator.

In this structure, when the rotational speed increases, the peak value of the phase detection signal becomes higher and the level of the threshold signal also becomes higher. Consequently, the ratio of the level of phase detection signal to the level of the threshold signal is maintained substantially uniform. Therefore, like the structure having the attenuator, the comparator in this structure can certainly discriminate the peak of the phase detection signal irrespectively of the rotational speed. As a result, even when the number of rotations of the brushless motor varies over a broader range, it is possible to accurately output the pulse signal.

Additionally, the rotational speed may be detected based on the pulse signal itself, a signal generated according to the pulse signal, for example, a head switching signal, or a signal detected by other means like an FG signal.

Moreover, since the phase detecting circuits of a brushless motor of various structures mentioned above can accurately output the pulse signal even when the number of rotations of the brushless motor varies within a broader range, they can be suitably used in various devices. It is particularly suitable for use in a magnetic recording and reproducing apparatus using a magnetic tape, such as a digital video tape.

With the use of such a digital video tape, since a desired track is searched at a high speed based on the absolute address recorded on the magnetic tape in advance, it is necessary for the brushless motor to adjust the rotational speed of the rotating drum according to the feed speed of the magnetic tape so that the track direction component of the relative speed of a magnetic head mounted on the rotating drum to the magnetic tape becomes uniform. Moreover, since the magnetic tape is wound on the rotating drum at a predetermined contact angle, if the phase of the magnetic head to the fixed section of the brushless motor is not precisely adjusted, the magnetic tape cannot scan the track on the magnetic tape. Hence, there is a great demand for a phase detecting circuit of a brushless motor, capable of generating a pulse signal indicating the phase of the rotating drum within a broader speed range.

By using the phase detecting circuit of the brushless motor having the above-mentioned structures for such a digital video tape, it is possible to accurately detect the phase of the rotating drum even when the feed speed of the magnetic tape is varied within a broader range. As a result, the speed of a high-speed search becomes faster, thereby shortening the time taken to access a desired track.

For a fuller understanding of the nature and advantages of the invention, reference should be made to the ensuing detailed description taken in conjunction with the accompanying drawings.

DESCRIPTION OF THE PREFERRED EMBODIMENTS

Embodiment 1

A drum phase detector of a magnetic recording and reproducing apparatus of this embodiment causes a PG detection signal to have a substantially uniform peak value by making a reverse correction to a primary differential characteristic which increases the amplitude of the PG detection signal substantially in proportion to the frequency by an integral characteristic of a low-pass filter. The following description will explain Embodiment 1 of the present invention with reference to the drawings.

The magnetic recording and reproducing apparatus is a magnetic recording and reproducing apparatus using a magnetic tape as a recording medium, for example, a digital video cassette recorder (digital VCR).

Figure 2:
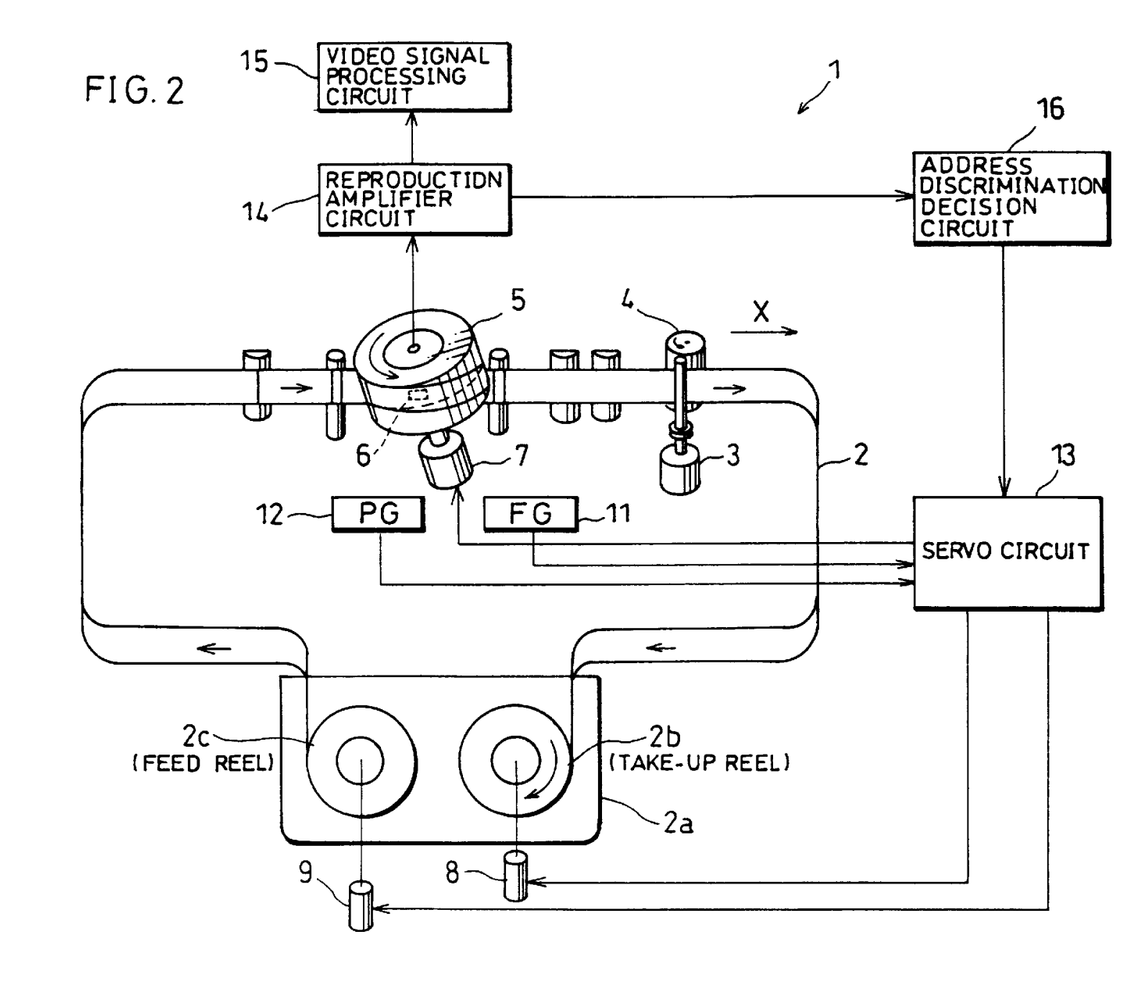
FIG. 2 is a view showing the structure of essential sections of the magnetic recording and reproduction apparatus.

More specifically, as illustrated in FIG. 2, a magnetic tape on which signals are magnetically recorded is sandwiched between a capstan motor 3 and a pinch roller 4 in a magnetic recording and reproducing apparatus 1. Therefore, the magnetic tape 2 is pulled in a lengthwise direction (hereinafter referred to as the feed direction and indicated as X in FIG. 2) of the magnetic tape 2 at a speed according to the rotational speed of the capstan motor 3. Moreover, the magnetic recording and reproducing apparatus 1 includes a rotating drum 5 on an upstream side of the magnetic tape 2 (where portions of the magnetic tape 2 which have not reached the capstan motor 3 are present). The magnetic tape 2 is wound on the rotating drum 5 at a predetermined contact angle, for example, 180°. A predetermined number of magnetic heads 6 are mounted on the peripheral surface of the rotating drum 5 so as to be in contact with the magnetic tape 2. The number and positions of the magnetic heads 6 on the peripheral surface of the rotating drum 5 are predetermined according to the standard of each magnetic recording and reproducing apparatus. Furthermore, a rotation axis 5a of the rotating drum 5 is inclined by a predetermined tilt angle with respect to the feed direction of the magnetic tape 2, and is driven to revolve by a drum motor 7.

In this structure, since the contact angle of the magnetic tape 2 is not 360°, after scanning the magnetic tape 2, the magnetic head 6 which is located in a certain position cannot scan the magnetic tape 2 for a predetermined period. Therefore, in order to control the rotation of the rotating drum 5, it is necessary to regulate not only the rotational speed, but also the phase. Hence, the magnetic recording and reproducing apparatus 1 includes a rotational speed detector (FG) 11 for detecting the rotational speed of the rotating drum 5, a rotational phase detector (PG) 12 for detecting the phase of the rotating drum 5, and a servo circuit 13 for controlling the rotation of the drum motor 7 based on the results of detections made by the detectors 11 and 12. Additionally, the magnetic recording and reproducing apparatus 1 includes a reproduction amplifier circuit 14 for amplifying a detection signal of the magnetic head 6, a video signal processing circuit 15 for processing signals recorded on the magnetic tape 2 based on an output signal of the reproduction amplifier circuit 14, and an address discrimination decision circuit 16, to be described later.

In recording and normal reproduction, the drum motor 7 rotates the rotating drum 5 at a predetermined speed, for example, 9000 [min$^{-1}$], while the capstan motor 3 feeds the magnetic tape 2 at a predetermined speed, for example, 37.6 [mm/sec.]. As a result, the magnetic head 6 scans the recording side of the magnetic tape 2 at an angle oblique to the lengthwise direction at a relative speed which is determined by the feed speed of the magnetic tape 2 and the rotational speed of the rotating drum 5. Consequently, a plurality of tracks arranged at predetermined intervals along the scanning direction are formed on the recording side of the magnetic tape 2 during recording. The magnetic head 6 successively scans these tracks during reproduction. In this structure, since the relative speed of the magnetic tape 2 to the magnetic head 6 can be made higher than that of a structure in which the magnetic head 6 is fixed, it is possible to achieve long-time recording by a high recording density. In the following description, the scanning direction is referred to as a "track direction".

Portions of the magnetic tape 2 which have passed through the capstan motor 3 are wound on a take-up reel 2b of a cassette 2a. Moreover, portions of the magnetic tape 2 which have not been guided to the rotating drum 5 are wound on a feed reel 2c. The take-up reel 2b and the feed reel 2c are driven by a take-up reel motor 8 and a feed reel motor 9, respectively.

In order to record or reproduce information on a predetermined track among the tracks on the magnetic tape 2, it is necessary to guide a portion of the magnetic tape 2 in which the track is formed to a position where the magnetic head 6 performs scanning. For example, in order to scan a track which has passed the rotating drum 5, it is necessary to feed the magnetic tape 2 in a direction opposite to a direction in normal reproduction so as to cause the track to pass the rotating drum 5 again. On the other hand, even when a desired track has not passed the rotating drum 5, if the distance between a track which is being scanned and the desired track is great, it takes a long time for the track to pass the rotating drum 5 if the magnetic tape 2 is fed at the feed speed in normal reproduction. Then, it is necessary for the magnetic recording and reproducing apparatus 1 to fast forward the magnetic tape 2 in the same direction as in normal reproduction (hereinafter referred to as the FF direction) or rewind the magnetic tape 2 in a direction opposite to that in normal reproduction (hereinafter referred to as the REW direction) at a higher speed than the normal speed. In the following description, guiding of the magnetic head 6 to a desired track on the magnetic tape 2 by forwarding the magnetic tape in a direction or at a speed different from those in normal reproduction will be called a "high-speed search". In general, in order to access a desired track at a faster speed, the magnetic recording and reproducing apparatus 1 cancels the drive of the capstan motor 3, and switches to a reel-to-reel drive in which the take-up reel motor 8 and the feed reel motor 9 are directly driven. In the reel-to-reel drive, when driving the magnetic tape 2 at high speeds by one of the reel motors 8 and 9, it is necessary for the other reel motor to control the tension of the magnetic tape 2 so as to achieve a good head touch between the magnetic tape 2 and the magnetic head 6.

In the devices like the digital VCR, absolute addresses are prerecorded on the respective tracks so as to enable an accurate and high-speed access to a desired track. The absolute addresses are such data that when an absolute address is read, which track among the whole tracks on the magnetic tape 2 corresponds to the absolute address. In the magnetic recording and reproducing apparatus 1, the address discrimination decision circuit 16 discriminates the absolute address of a track which is being scanned by the magnetic head 6 based on an output signal of the reproduction amplifier circuit 14. When the magnetic recording and reproducing apparatus 1 is switched to the reel-to-reel drive during a high-speed search, the servo circuit 13 controls the rotations of the reel motors 8 and 9 and the drum motor 7 based on an instruction from the address discrimination decision circuit 16 so that the track direction component of the relative speed of the magnetic tape 2 to the magnetic head 6 becomes substantially the same as the relative speed in normal reproduction.

More specifically, when performing a high-speed search in the FF direction, the servo circuit 13 controls the rotational speed of the take-up reel motor 8 based on a detection signal from the FG (not shown) of the take-up reel motor 8, and controls the rotational speed and phase of the drum motor 7 based on detection signals from the FG 11 and PG 12. On the other hand, when performing a high-speed search in the REW direction, the servo circuit 13 controls the rotational speed of the feed reel motor 9 based on a detection signal from the FG (not shown) of the feed reel motor 9, and appropriately controls the rotational speed and phase of the drum motor 7 like in the search in the FF direction. As a result, the magnetic recording and reproducing apparatus 1 can read the absolute address from the magnetic tape 2 without any problems even in a high-speed search.

For example, when performing a high-speed search in the FF direction at a speed 200 times higher than that in normal reproduction, the number of rotations of the rotating drum 5 is controlled to be about 15,500 [$\text{min}^{-1}$]. When performing a high-speed search in the REW direction at a speed 200 times higher than that in normal reproduction, the number of rotations of the rotating drum 5 is controlled to be about 2,400 [$\text{min}^{-1}$].

Figure 3A:
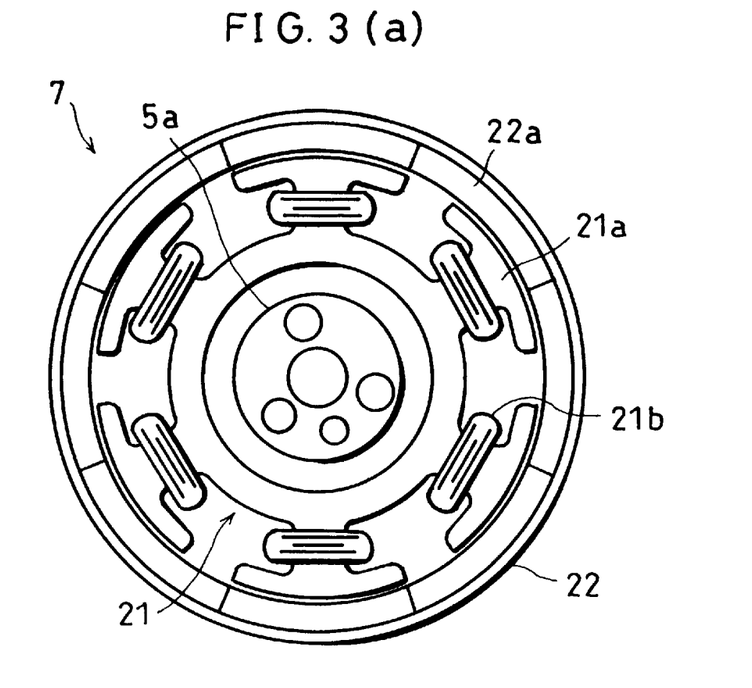
FIG. 3(a) is a plane view showing the relationship between driving magnets and driving coils in a drum motor of the magnetic recording and reproducing apparatus.
Figure 3B:
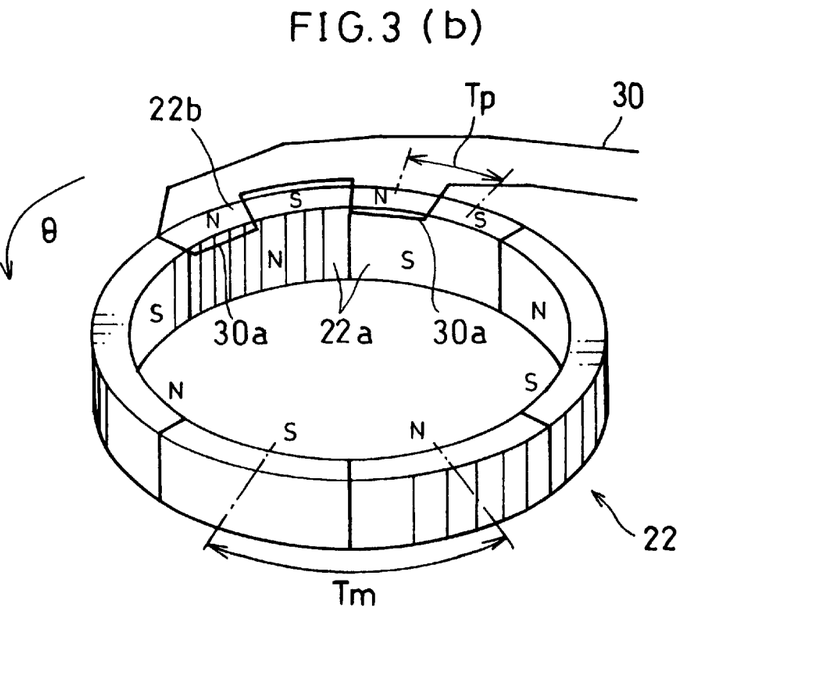
FIG. 3(b) is a perspective view showing the arrangement of a PG detecting coil in the drum motor.
Figure 3C:
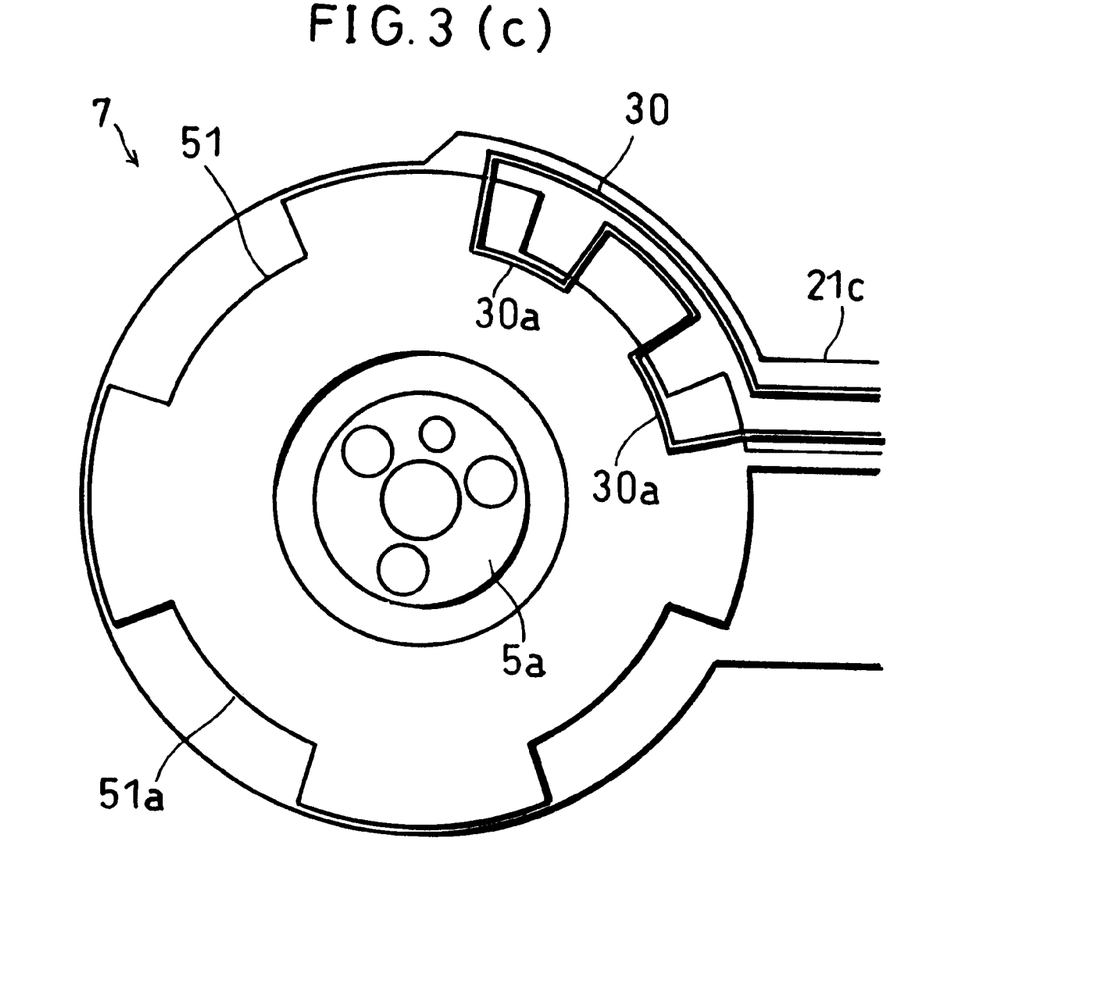
FIG. 3(c) is a plane view showing the arrangement of the PG detecting coil in the drum motor.

Referring now to FIGS. 3(*a*) to 3(*c*), the following description will explain an example of the specific structure of the drum motor 7, FG 11 and PG 12.

For example, the drum motor 7 is a brushless motor having six poles, and includes a stator (fixed section) 21, and a rotor (rotating section) 22 which is arranged to surround the stator 21 and rotates on the rotation axis 5*a* as shown in FIG. 3(*a*). The stator 21 includes cores 21*a* which support the rotation axis 5*a* rotatably through ball bearings and the like, and driving coils 21*b* wound on the cores 21*a*.

The rotor 22 is positioned to face the respective driving coils 21*b*, and includes driving magnets 22*a* which are magnetized in directions (radial directions) perpendicular to the rotation axis 5*a*. The driving magnets 22*a* are magnetized so that the N pole regions and the S pole regions are alternately located along the rotating direction of the rotation axis 5*a*. The number of the poles of the driving magnets 22*a* and the number of the driving coils 21*b*, etc. are determined according to the required characteristics of the drum motor 7, for example, torque. It is arranged in this embodiment that the number of the driving coils 21*b* is six and the number of the poles of the driving magnets 22*a* is eight.

As shown in FIG. 3(*b*), PG forming magnets 22*b* which are magnetized in an axis direction perpendicular to the magnetized direction of the driving magnets 22*a* are provided on the rotor 22. Like the driving magnets 22*a*, the N poles and the S poles are alternately arranged in the PG forming magnets 22*b*. However, unlike the driving magnets 22*a*, the N poles and the S poles are formed partially on the circumference of a circle. It is arranged in this embodiment that the number of poles of the PG forming magnets 22*b* is four, and the ratio of the magnetized pitch Tm of the driving magnet 22*a* to the magnetized pitch Tp of the PG forming magnets 22*b* is 2:1.

Moreover, as shown in FIG. 3(*c*), an FG detecting pattern 51 and a PG detecting pattern 30 are disposed in a circle on a stator substrate 21*c* of the stator 21. The FG detecting pattern 51 includes protruding sections 51*a* having a substantially square bracket shape at positions facing the FG forming magnet, not shown. Similarly, the PG detecting pattern 30 includes protruding sections 30*a*, which have a substantially square bracket shape and protrude towards the rotating axis 5*a*, at positions so that the protruding sections 30*a* face the PG forming magnets 22*b* when the PG forming magnets 22*b* rotate and pass the protruding sections 30*a*. In this embodiment, since the number of poles of the PG forming magnets 22*b* is four, the PG detecting pattern 30 has two protruding sections 30*a*.

With this structure, when the relative position of the FG forming magnet to the FG detecting pattern 51 is changed by a rotation of the rotor 22, a voltage corresponding to the varying speed is induced on the FG detecting pattern 51, and the FG 11 generates an FG detection signal in pulses. As described above, since the FG detecting pattern 51 is disposed at the position facing the FG forming magnet, a plurality of FG detection signals are generated by one rotation of the rotor 22. Therefore, the FG 11 can generate FG detection signals in a uniform cycle proportional to the number of rotations of the rotating drum 5. Thus, in the magnetic recording and reproducing apparatus 1, the number of rotations of the rotating drum 5 can be detected by the servo circuit 13.

On the other hand, since the relative position of the PG forming magnets 22*b* to the PG detecting pattern 30 is changed by a rotation of the rotor 22, a voltage according to the rotational speed is induced on the PG detecting pattern 30, and the PG 12 generates a PG detection signal in pulses according to the voltage. However, as described above, since the PG detecting pattern 30 is positioned to face the PG forming magnets 22*b* when the PG forming magnets 22*b* rotate and pass the PG detecting pattern 30, one PG detection signal is generated every time the PG detecting pattern 30 faces the PG forming magnets 22*b*, i.e., by one rotation of the rotor 22. Consequently, in the magnetic recording and reproducing apparatus 1, the phase of the rotor 2 with respect to the stator 21, i.e., the absolute position of the magnetic head 6 in the magnetic recording and reproducing apparatus 1, can be discriminated by the servo circuit 13.

Figure 1:
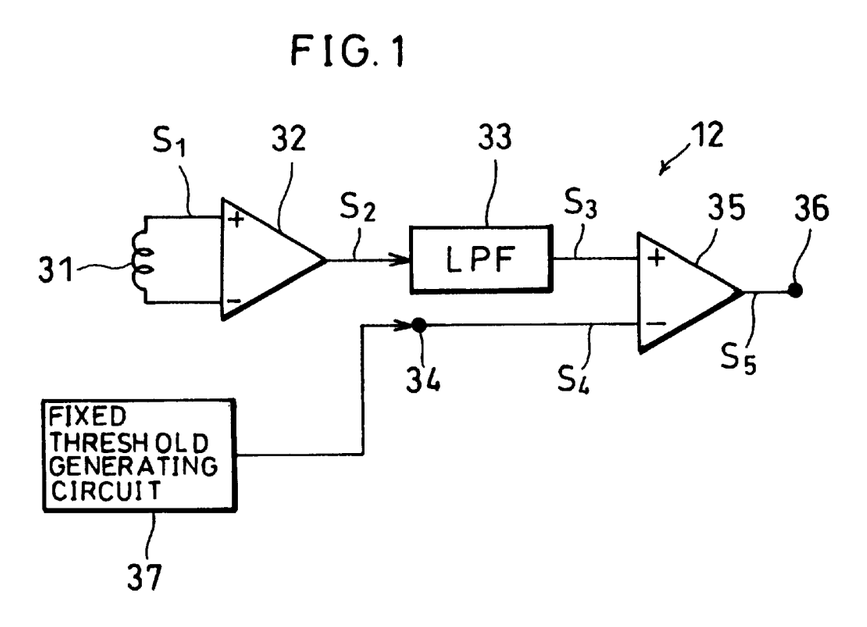
FIG. 1 is a circuit block diagram showing an example of the structure of the principal section of a phase detection circuit of a brushless motor in a magnetic recording and reproduction apparatus according to Embodiment 1.

Referring now to the block diagram shown in FIG. 1, the following description will explain in detail the circuit structure of the PG 12 of this embodiment. It was explained in the above that the PG detection signal is generated by the PG based on the voltage induced on the PG detecting pattern 30. However, the present invention is not necessarily limited to this structure. The same effect as that obtained by the use of the PG detecting pattern 30 is produced by an element capable of generating an electrical signal corresponding to the varying speed of the relative position of the PG forming magnets 22*b* to the element. Therefore, a structure including such an element in the PG detecting pattern 30 will be referred to as a PG detecting coil 31 in the following description.

In the PG 12, the PG detecting coil 31 generates a PG reproduction signal (corresponding to an electrical signal in the claims) $S_1$ based on a rotation of the rotating drum 5. The PG reproduction signal $S_1$ is input to the differential amplifier 32, and amplified to a level permitting signal processing so as to produce a PG detection signal (corresponding to a phase detection signal in the claims) $S_2$. The PG detection signal $S_2$ is input to a first order low-pass filter 33. An output $S_3$ from the low-pass filter 33 is input to the noninverted input of a comparator 35, and compared with a fixed threshold $S_4$ input to the inverted input from the terminal 34. The fixed threshold $S_4$ is set to a predetermined level, and generated by a fixed threshold generating circuit 37. A digital signal (PG pulse corresponding to a pulse signal in the claims) which shows a logic state "1" when the output $S_3$ is greater than the threshold $S_4$ and a logic state "0" when the output $S_3$ is smaller than the threshold $S_4$ is output to a terminal 36 from the comparator 35.

As described above, the first order low-pass filter 33 makes a reverse correction to a primary differential characteristic which increases the amplitude of the PG detection signal $S_2$ in proportion to the frequency with an integral characteristic of the low-pass filter 33, and generates the signal $S_3$ having a substantially uniform peak value from the PG detection signal $S_2$. Therefore, the low-pass filter 33 must have an integral characteristic in the frequency range of the PG detection signal $S_2$. It is thus necessary to arrange the low-pass filter 33 so that at least its cutoff frequency is lower than a minimum value in the frequency range of the PG detection signal $S_2$ corresponding to the rotational speed range of the rotating drum 5 which is required of the speed control.

If the cutoff frequency is too low, the signal level of the PG detection signal $S_2$ becomes lower. Therefore, it is desired to make the cutoff frequency of the low-pass filter 33 as high as possible.

Therefore, a desired cutoff frequency needs to be as follows. Namely, it is desired to set the cutoff frequency in the vicinity of a frequency given by $$(Tm \times NL \times P) \div (Tp \times 60 \times 2) \text{ [Hz]}$$

where NL is the minimum number of rotations of the rotating drum 5 per minute in a high-speed search, Tp is the magnetized pitch between the N pole and S pole of the PG forming magnet 22b, Tm is the magnetized pitch between the N pole and S pole of the driving magnet 22a of the drum motor 7, and P is the number of the poles of the driving magnet 22a shown in FIG. 3(b). As the unit of the magnetized pitch Tp, any measurement unit can be used if it is the same as the measurement unit used for the magnetized pitch Tm.

More specifically, in the case of the drum motor 7 having the structure shown in FIGS. 3(a) to 3(c), the following equations are established.

$$Tm \div Tp = 2$$

$$P = 8$$

Regarding a high-speed search performed at a speed 200 times higher than that in normal reproduction, the rotational speed of the rotating drum 5 becomes the lowest when such a high-speed search is performed in the REW direction. In this case, the number of rotations of the rotating drum 5 is about 2,400 [min$^{-1}$]. Accordingly, it is desired to set the cutoff frequency of the first order low-pass filter 33 at about 320 [Hz] based on the calculation $(2 \times 2400 \times 8) \div (60 \times 2)$.

In the magnetic recording and reproducing apparatus having the above-mentioned structure of this embodiment, since the amplitude of the signal $S_3$ input to the comparator 35 from the first order low-pass filter 33 is made substantially uniform, it is possible to certainly detect only the main pulse 65 shown in FIGS. 4(a) to 4(c) and accurately generate the PG pulse. Therefore, it is possible to perform accurate rotational speed control within the rotational speed range of the rotating drum 5 during a high-speed search.

In this embodiment, the PG detection signal is attenuated by the use of the first order low-pass filter. However, it is not necessary to limit the present invention to such a structure. Namely, it is possible to use other members that can attenuate the PG detection signal substantially in proportion to the frequency. However, since the first order low-pass filter is formed by, for example, a RC circuit and the like, it is possible to simplify the circuit compared to a structure where other some member is used.

Embodiment 2

The following description will explain Embodiment 2 of the present invention with reference to the drawings. The structures having the same function as in Embodiment 1 will be designated by the same number and their description will be omitted.

Figure 5A:
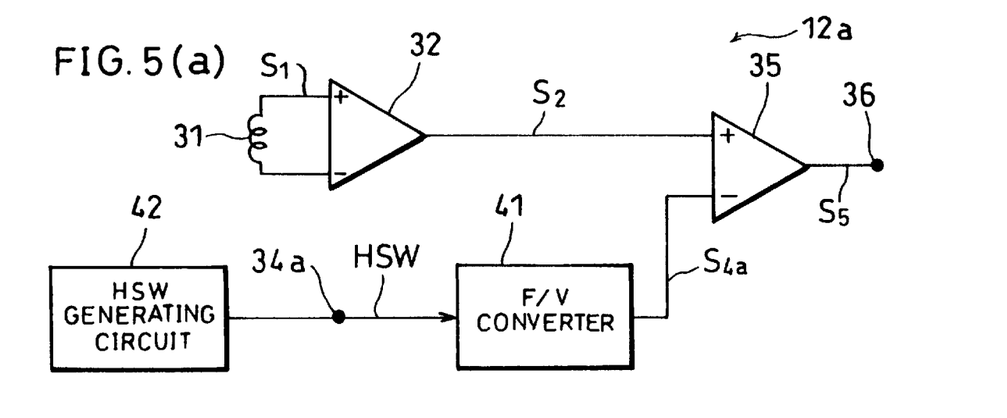
FIG. 5(a) is a circuit block diagram showing an example of the structure of the principal section of a phase detection circuit of a brushless motor in a magnetic recording and reproducing apparatus according to Embodiment 2.

FIG. 5(a) is a block diagram showing the circuit structure of a drum phase detector (PG) 12a of this embodiment. Here, the PG detecting coil 31 generates a PG reproduction signal $S_1$ based on a rotation of the rotating drum 5. The PG reproduction signal $S_1$ is input to the differential amplifier 32, and amplified to a level permitting signal processing so as to produce a PG detection signal $S_2$. The PG detection signal $S_2$ is input to the non-inverted input of a comparator 35.

A variable threshold $S_{4a}$ which is substantially proportional to the number of rotations of the rotating drum 5 is input to the inverted input of the comparator 35. In this embodiment, a signal produced by processing a head switching signal HSW in a F/V convertor 41 is used as the variable threshold $S_{4a}$. The head switching signal HSW is a signal for switching a plurality of magnetic heads 6 mounted on the rotating drum 5 with a rotation of the rotating drum 5, and is generated by a HSW generating circuit 42 based on a PG pulse signal $S_5$ as an output of the comparator 35.

The comparator 35 produces the PG pulse signal $S_5$ by comparing the PG detection signal $S_2$ and the variable threshold $S_{4a}$, and outputs the PG pulse signal $S_5$ to a terminal 36.

The F/V convertor 41 is adjusted so as to output the variable threshold $S_{4a}$ of a level that allows only the main pulse 65 of the PG detection signal (see FIGS. 4(a) to 4(c)) to be taken out based on the relationship between the frequency of the head switching signal HSW and the amplitude level of the PG detection signal $S_2$, which was studied in advance.

In this structure, even when the number of rotations of the rotating drum 5 is increased, for example, from 9,000 [min$^{-1}$] to 15,500 [min$^{-1}$], since the variable threshold $S_{4a}$ in the comparator 35 becomes higher with an increase in the number of rotations of the rotating drum 5, the spurious peak 64 of the signal waveform of the PG detection signal $S_2$ can never exceed the threshold $S_{4a}$. Similarly, even when the peak of the main pulse 65 of the signal waveform of the PG detection signal $S_2$ is lowered as a result of a decrease in the number of rotations of the rotating drum 5 from 9,000 [min$^{-1}$] to 2,400 [min$^{-1}$], since the variable threshold $S_{4a}$ in the comparator 35 becomes lower appropriately substantially in proportion to the decrease in the number of rotations of the rotating drum 5, the main pulse 65 certainly exceeds the threshold $S_{4a}$. It is therefore possible to certainly detect only the main pulse 65 and correctly produce the PG pulse, irrespectively of the number of rotations of the rotating drum 5.

Figure 5B:
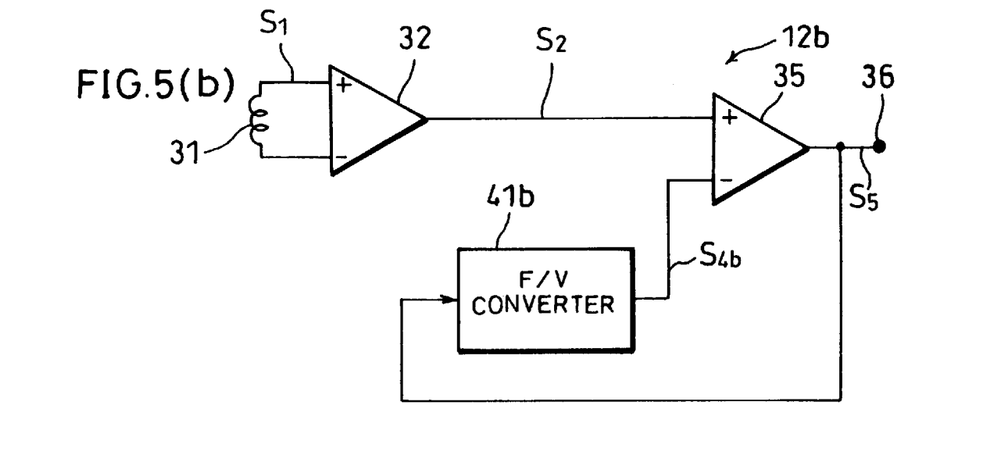
FIG. 5(b) is a circuit block diagram showing another example of the structure of the principal section of a phase detection circuit of a brushless motor in a magnetic recording and reproducing apparatus according to Embodiment 2.

In this embodiment, the threshold is varied according to a signal which is substantially proportional to the number of rotations of the rotating drum 5. Therefore, like the PG 12b shown in FIG. 5(b), even if a feedback structure in which the output (PG pulse) $S_5$ of the comparator 35 is input to the F/V convertor 41b instead of the head switching signal HSW, it is certain that the same effect is produced.

As described above, a first magnetic recording and reproducing apparatus of the present invention is a magnetic recording and reproducing apparatus capable of searching an absolute address recorded on a magnetic tape by feeding the magnetic tape at a speed higher than a speed in normal reproduction and moving the magnetic tape relatively to a magnetic head mounted on a rotating drum by rotating the rotating drum by a drum motor, and characterized in including a phase detecting magnet disposed on a rotor of the drum motor, a rotational phase detector which is disposed on a stator of the drum motor and detects a change in the relative position of the phase detecting magnet to the rotational phase detector as an electrical signal, an amplifier for generating a phase detection signal by amplifying the electrical signal, an attenuator for attenuating the amplitude of the phase detection signal substantially in proportion to the frequency of the phase detection signal, and a comparator for generating a pulse signal according to the number of rotations of the rotating drum by comparing an output of the attenuator and a predetermined threshold.

In this structure, the variation in the level of the phase detection signal due to the variation in the number of rotations of the rotating drum is cancelled out by the attenuator. It is therefore possible to make the level of the phase detection signal substantially uniform irrespectively of the number of rotations of the rotating drum, and obtain an accurate pulse signal by only comparing the phase detection signal and a predetermined fixed threshold. Consequently, a correct detection of the PG pulse can be achieved by only comparing the phase detection signal with a fixed threshold within a rotational speed range of the rotating drum during a high-speed search. As a result, the rotational speed range of the rotating drum during a high-speed search can be broadened compared to a conventional structure, thereby shortening the time taken for the high-speed search.

A second magnetic recording and reproducing apparatus of the present invention is based on the structure of the first magnetic recording and reproducing apparatus, and the attenuator is formed by a first order low-pass filter having a cutoff frequency which is set in the vicinity of a frequency given by $$(Tm \times NL \times P) \div (Tp \times 60 \times 2) \text{ [Hz]}$$

where NL is the minimum number of rotations of the rotating drum per minute in the high-speed search, Tp is the magnetized pitch between the N pole and S pole of the phase detecting magnet, Tm is the magnetized pitch between the N pole and S pole of the driving magnet of the drum motor, and P is the number of the poles of the driving magnet.

In this structure, it is possible to convert the PG detection signal into a signal having a substantially uniform peak value by using a first order low-pass filter having a simple circuit structure, formed by, for example, a RC circuit. Moreover, since the cutoff frequency is set in the vicinity of the frequency given by the formula, it is possible to obtain a sufficiently high peak value within the cutoff frequency range capable of maintaining a uniform peak value.

On the other hand, a third magnetic recording and reproducing apparatus of the present invention is a magnetic recording and reproducing apparatus for searching an absolute address recorded on a magnetic tape at a high speed by feeding the magnetic tape at a speed higher than a speed in normal reproduction, and rotating the rotating drum having the drum motor so as to move the magnetic tape relatively to the magnetic head mounted on the rotating drum, and characterized in including a phase detecting magnet disposed on the rotor of the drum motor, a rotational phase detector which is disposed on the stator of the drum motor and detects a change in the relative position of the phase detecting magnet to the rotational phase detector as an electrical signal, an amplifier for generating a phase detection signal by amplifying the electrical signal, a threshold changer for generating a threshold signal which is substantially proportional to the rotational frequency of the rotating drum, and a comparator for generating a pulse signal according to the number of rotations of the rotating drum by comparing the phase detection signal with the threshold signal.

A fourth magnetic recording and reproducing apparatus of the present invention is based on the structure of the third magnetic recording and reproducing apparatus, and characterized in that the threshold changer is formed by a F/V convertor for outputting a voltage signal which is substantially proportional to the frequency of a head switching signal generated based on the pulse signal.

Further, a fifth magnetic recording and reproducing apparatus of the present invention is based on the structure of the third magnetic recording and reproducing apparatus, and characterized in that the threshold changer is formed by a F/V convertor for outputting a voltage signal which is substantially proportional to the frequency of the pulse signal.

In the third, fourth and fifth magnetic recording and reproducing apparatuses, the threshold changer changes the threshold input to the comparator in proportion to the number of rotations of the rotating drum. Therefore, even if the number of rotations of the drum varies over a broad range, it is possible to obtain an accurate pulse. As a result, the rotational speed range of the rotating drum during a high-speed search can be broadened compared to a conventional structure, thereby shortening the time taken for the high-speed search.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A phase detecting circuit of a brushless motor for outputting a pulse signal when a phase of a rotating section of said brushless motor with respect to a fixed section thereof is a predetermined phase, comprising:

a phase detecting magnet disposed in said rotating section of said brushless motor;

a rotational phase detector, disposed in said fixed section of said brushless motor, for detecting as an electrical signal a change in a relative position of said phase detecting magnet to said rotational phase detector;

an amplifier for generating a phase detection signal by amplifying the electrical signal;

an attenuator for attenuating an amplitude of the phase detection signal substantially in proportion to a frequency of the phase detection signal within a predetermined frequency range to suppress amplitude fluctuations of the phase detection signal caused by changes in a rotational speed of the motor; and a comparator for generating the pulse signal based on a relationship between a level of an output of said attenuator and a threshold signal of a predetermined level.

2. The phase detecting circuit of the brushless motor as set forth in claim 1, wherein said attenuator is a first order low-pass filter.

3. The phase detecting circuit of the brushless motor as set forth in claim 2, wherein a cutoff frequency F [Hz] of said low-pass filter satisfies $$F \cong (Tm \times NL \times P)/(Tp \times 60 \times 2)$$

where NL [min$^{-1}$] is a lower limit of a predetermined rotational speed range of said brushless motor, Tp is a magnetized pitch between an N pole and an S pole of said phase detecting magnet, Tm is a magnetized pitch between an N pole and an S pole of a driving magnet of said brushless motor, and P is a number of poles of said driving magnet.

4. The phase detecting circuit of the brushless motor as set forth in claim 1, wherein said phase detecting magnet is magnetized in a direction perpendicular to a rotation axis of said rotating section, and said rotational phase detector is a pattern shaped like a substantially square bracket, positioned to face said phase detecting magnet.

5. A phase detecting circuit of a brushless motor for outputting a pulse signal when a phase of a rotating section of said brushless motor with respect to a fixed section is a predetermined phase, comprising:

a phase detecting magnet disposed in said rotating section of said brushless motor;

a rotational phase detector, disposed in said fixed section of said brushless motor, for detecting as an electrical signal a change in a relative position of said phase detecting magnet to said rotational phase detector;

an amplifier for generating a phase detection signal by amplifying the electrical signal;

a threshold changer for generating a threshold signal which is substantially proportional to a rotational frequency of said brushless motor to change a level of the threshold signal in accordance with amplitude fluctuations of the phase detection signal caused by changes in a rotational speed of the motor; and a comparator for generating the pulse signal based on a relationship between a level of the phase detection signal and a level of the threshold signal.

6. The phase detecting circuit of the brushless motor as set forth in claim 5, wherein said threshold changer includes a frequency to voltage convertor for outputting a voltage signal which is substantially proportional to a frequency of the pulse signal.

7. A recording and reproducing apparatus capable of feeding a magnetic tape at a speed different from a speed in normal reproduction and searching an absolute address recorded on the magnetic tape at a high speed, comprising:

a rotating drum on which the magnetic tape is wound at a predetermined contact angle;

a magnetic head, disposed in said rotating drum, for reading records on the magnetic tape;

a brushless motor for rotating said rotating drum;

a phase detecting magnet disposed in a rotating section of said brushless motor;

a rotational phase detector, disposed in a fixed section of said brushless motor, for detecting as an electrical signal a change in a relative position of said phase detecting magnet to said rotational phase detector;

an amplifier for generating a phase detection signal by amplifying the electrical signal;

an attenuator for attenuating an amplitude of the phase detection signal substantially in proportion to a frequency of the phase detection signal in a predetermined frequency range according to the high-speed search to suppress amplitude fluctuations of the phase detection signal caused by changes in a rotational speed of the motor;

a comparator for generating a pulse signal based on a relationship between a level of an output of said attenuator and a threshold signal of a predetermined level; and a rotation controlling section for controlling a rotation of said brushless motor based on the pulse signal.

8. The recording and reproducing apparatus as set forth in claim 7, wherein said attenuator is a first order low-pass filter.

9. The recording and reproducing apparatus as set forth in claim 8, wherein a cutoff frequency F [Hz] of said low-pass filter satisfies $$F \approx (Tm \times NL \times P)/(Tp \times 60 \times 2)$$

where NL [min$^{-1}$] is a smallest number of rotations of said brushless motor during the high-speed search, Tp is a magnetized pitch between an N pole and an S pole of said phase detecting magnet, Tm is a magnetized pitch between an N pole and an S pole of a driving magnet of said brushless motor, and P is a number of poles of said driving magnet.

10. The magnetic recording and reproducing apparatus as set forth in claim 7, wherein said rotation controlling section controls a rotation of said brushless motor upon an instruction of a high-speed search so that a track direction component of a relative speed of the magnetic tape to said magnetic head becomes the same as a relative speed in normal reproduction.

11. A recording an reproducing apparatus capable of forwarding a magnetic tape at a speed different from a speed in normal reproduction and searching an absolute address recorded on the magnetic tape at a high speed, comprising:

a rotating drum on which the magnetic tape is wound at a predetermined contact angle;

a magnetic head, disposed in said rotating drum, for reading records on the magnetic tape;

a brushless motor for rotating said rotating drum;

a phase detecting magnet disposed in a rotating section of said brushless motor;

a rotational phase detector, disposed in a fixed section of said brushless motor, for detecting as an electrical signal a change in a relative position of said phase detecting magnet to said rotational phase detector;

an amplifier for generating a phase detection signal by amplifying the electrical signal;

a threshold changer for generating a threshold signal which is substantially proportional to a rotational frequency of said brushless motor to change a level of the threshold signal in accordance with amplitude fluctuations of the phase detection signal caused by changes in a rotational speed of the motor;

a comparator for generating a pulse signal based on a relationship between a level of the phase detection signal and a level of the threshold signal; and a rotation controlling section for controlling a rotation of said brushless motor based on the pulse signal.

12. The recording and reproducing apparatus as set forth in claim 11, wherein said threshold changer includes a frequency to voltage convertor for outputting a voltage signal which is substantially proportional to a frequency of the pulse signal.

13. The recording and reproducing apparatus as set forth in claim 11, wherein said threshold changer includes a frequency to voltage convertor for outputting a voltage signal which is substantially proportional to a frequency of a specific signal which varies according to the pulse signal.

14. The recording and reproducing apparatus as set forth in claim 13, wherein said specific signal is a head switching signal indicating whether or not said magnetic head is scanning the magnetic tape.

15. A phase detecting circuit of a brushless motor for outputting a pulse signal when a phase of a rotating section of said brushless motor with respect to a fixed section thereof is a predetermined phase, comprising:

a phase detecting magnet disposed in said rotating section of said brushless motor;

a rotational phase detector, disposed in said fixed section of said brushless motor, for generating electrical signals indicative of changes in a relative position of said phase detecting magnet to said rotational phase detector;

an amplifier for generating phase detection signals by amplifying the electrical signals;

a circuit for making the levels of phase detection signals generated over a range of rotational speeds of said motor substantially the same; and a comparator for generating the pulse signal based on a relationship between a level of an output of said circuit and a threshold signal of a predetermined level.

16. The phase detecting circuit as set forth in claim 15, wherein said circuit is a first order low-pass filter.

17. The phase detecting circuit as set forth in claim 15, wherein the range of rotational speeds over which said circuit makes the levels of phase detection signals the same is from about 2400 $min^{-1}$ to about 15,500 $min^{-1}$.

\* \* \* \* \*